Patented Oct. 9, 1934

1,976,221

UNITED STATES PATENT OFFICE 1,976,221

WOOD PRESERVATIVE

Ralph T. Goodwin, Elizabeth, N. J., John S. Rearick, Westport, Conn., and Howard P. Ferguson, Paterson, N. J., assignors to The Dorr Company, Inc., New York, N. Y., a corporation of Delaware No Drawing. Application October 10, 1931, Serial No. 568,200

5 Claims. (Cl. 134—78.6)

This invention relates to preservatives of the type used to impregnate wood products which has both preservative and toxic effects.

In the past, preserving of wood such as railroad ties, telegraph poles, etc., has been accomplished chiefly by the use of creosote oil. In the past few years a few methods have been developed in which chemicals such as zinc chloride have been generally adopted.

It has been well established that creosote is a good preserving material, but it has two disadvantages. First, the high cost; and second, the fact that the material does not readily oxidize on the surface so that the creosote slowly leaches out from the wood.

For the past few years there has been an attempt to substitute, either entirely or in part, a petroleum oil for creosote but with a small degree of success because when a high asphaltic oil is used, such as a reduced crude, the viscosity is so high that it is difficult to obtain a suitable degree of penetration, of the preservative oil into the wood.

An attempt has been made to use as a preservative a cracked residuum which ordinarily has a low viscosity and would seem to be an ideal product. It was found however, that in using a cracked residuum, the surface of the wood was soon covered by finely divided bituminous matter so that the oil thereafter penetrated the wood with great difficulty. These results are logical and to be expected in view of the fact that it is known to be difficult to filter an untreated cracked residuum due to the filter medium soon becoming covered by finely divided material which practically prevents filtration. This same effect no doubt takes place on the surface of the wood.

Nevertheless, a cracked residuum when freed from these separating solids, has several advantages when used as a preservative. First, the viscosity of cracked residuum is low so as to gain penetration. Second, the asphaltic content can be regulated so that some oxidation takes place on the surface of the wood, forming a bituminous coating which prevents leaching of the preservative solution. This same bituminous coating is very effective in reducing the rate of moisture interchanged on the surface, thereby extending the life of the wood.

This treated residuum can be used alone as a preservative or can be mixed with other preservative materials such as creosote oil or applied as emulsions mixed with chemicals such as zinc chloride or can be used as a vehicle to carry other desirable toxic chemicals.

Accordingly, the object of this invention is to so treat a cracked residuum that it is suitable for use as a wood preservative and then so combining it with a toxic substance that an effective and cheap preservative is thus obtained.

More particularly, the object of this invention is to treat the residuum and for instance a creosote oil, so that substantially all gummy and carbonaceous solids or sediment are removed therefrom, which heretofore have been so troublesome when attempting to mix or blend a petroleum oil and creoste.

In brief, these objects are attained by precipitating the troublesome solids and/or hydrocarbons unstable in the presence of the toxic substance by flocculating the residuum in the presence of an acid or salts which hydrolize to form acids. Flocculation preferably takes place in successive stages and at one of these stages the toxic substance (having the same toxic function as creosote) is added so that in a final stage, a mixture or blending of cracked residuum and creosote takes place. In the first stages, the carbonaceous matter in the oil residue is flocculated and the carbon flocs are then made use of in the later flocculation state to collect the gummy precipitates produced after the creosote is added. The flocculated blended mixture with its troublesome solids coagulated is then clarified such as by sedimentation or filtration, or both, the final effluent or filtrate comprising the wood preservative product of this invention.

The invention may be carried out as follows: the cracked residuum, which may the residue from the oil cracking process such as pressure still tar, cracking coil tar, and the like, has mixed therewith an acid or salts which hydrolize to form acids, such as sodium acid sulfate or aluminum sulfate. Ordinarily a small percentage of acid is sufficient, about one-half of one percent by volume of the oil to be treated. Sulfuric acid is the most economical especially since spent acid may be used which is obtained elsewhere from oil treating plants.

The oil and acid are then mixed preferably while heated to temperatures up to 800° F. (as heat facilitates the process) in an agitator or flocculator wherein precipitation takes place and also coagulation and agglomeration of the suspended solids. This mixture is then led to a second mixer or flocculator and again to a third. However, the number of flocculators or successive stages of flocculation are important only to the extent that precipitation and coagulation shall have been effectively carried out and completed, namely that settleable flocs are produced.

At some intermediate stage of agitation and flocculation, the creosote oil is added to the residual oil, for instance if three flocculators are used, the creosote oil should preferably be added to the residual oil in the second flocculator. The reason for this is to consume substantially all the acid before adding the creosote, or at least until the acidity is low enough not to cause sludging of the oil-creosote mixture. Otherwise, the creosote reacts with the acid and produces sludge whereby large amounts of carbonaceous matter is thrown down which are difficult to filter. The flocculated carbon coagulated in the first stage or stages, prior to the addition of the creosote, coagulates or acts as a collector for the gummy precipitates arising out of the creosote when it is added to the flocculated oil residue. Flocculation of the mixture requires from one to three hours but it is the settleability of the flocs which governs the time of agitation or flocculation.

From the final stage of agitation, the blended mixture with its flocs is preferably held quiescent to permit the flocs to settle whereupon they can be removed either by sedimentation, filtration or both. Sedimentation can be brought about in thickeners of the Dorr type while filtration can be brought about in a continuous filter of either the Dorr or Oliver types, or in pressure filters.

The effluent or filtrate comprises the oil-creosote wood preservative blend of this invention. It is stable and practically free from suspended matter. A typical sample of a blend of 50% residuum and 50% creosote has the following physical characteristics, although obviously the physical properties of the finished product will vary considerably depending upon the physical properties of the residuum and creosote mixture used and the proportion in which they are blended:

Sp. Gr. at 60° F _____ 1.047
Viscosity at 180° F _____ 1.53 degrees Engler
  (50 sec. Saybolt Universal)
Flash (open cup) _____ 230° F.
Fire _____ 250° F.
CS₂ solubles _____ 98.66%
B. S. (by centrifuge) _____ 0.4%

The residuum from which sample was made had the following inspection.

Gravity A. P. I. _____ 9.0°
Viscosity Univ. at 180° F _____ 85 sec.
  (2.45 degrees Engler)
B. S. & W. (by centrifuge) _____ 0.1%
Sediment (benzol extraction) _____ 0.18%
CS₂ solubles _____ 99.5%

Chemical analysis shows that an average pressure residuum contains the following components:

|   | Per cent |
|---|---|
| 1. Free asphaltous resins | 2.5 |
| 2. Asphaltous anhydrides | |
| 3. Asphaltic resins | 4.0 |
| 4. Asphaltenes | 6.0 |
| 5. Inactive oil | 87.0 |

The proportion of creosote oil to residual oil is governed by the toxic effect desired from the mixture. A representative mixture can be composed of 10% creosote to 60% oil. Naturally larger proportions of creosote may be used where greater toxic effect is desired.

Whereas creosote oil has been referred to for use as the toxic agent, the invention is broad enough to include any substance having substantially the same toxic function as creosote altho with a greater or lesser toxicity, which can be carried by a petroleum oil as a blended mixture, suspension, emulsion or solution.

We claim:

1. A wood preservative composed of a toxic substance and an acid treated cracked pressure residuum as a carrier therefor.

2. A wood preservative composed of a stable blend free from suspended solids of a cracked petroleum oil and a toxic oil.

3. A wood preservative composed of a stable blend free from suspended solids of a cracked petroleum oil and creosote.

4. A wood preservative composed of a stable mixture of a cracked residuum and creosote.

5. A wood preservative having as one ingredient thereof a cracked residuum.

RALPH T. GOODWIN.
JOHN S. REARICK.
HOWARD P. FERGUSON.